United States Patent
Clancy

(10) Patent No.: US 9,674,564 B2
(45) Date of Patent: Jun. 6, 2017

(54) SYSTEM AND METHODS FOR MULTICAST DELIVERY OF INTERNET PROTOCOL VIDEO CONTENT

(71) Applicant: ARRIS Enterprises, Inc., Suwanee, GA (US)

(72) Inventor: Paul A. Clancy, Duluth, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/570,257

(22) Filed: Dec. 15, 2014

(65) Prior Publication Data

US 2016/0173922 A1 Jun. 16, 2016

(51) Int. Cl.

| | | |
|---|---|---|
| H04H 60/32 | (2008.01) | |
| H04N 7/173 | (2011.01) | |
| H04N 21/25 | (2011.01) | |
| H04N 21/6405 | (2011.01) | |
| H04N 21/61 | (2011.01) | |
| H04N 21/262 | (2011.01) | |

(Continued)

(52) U.S. Cl.
CPC ......... *H04N 21/251* (2013.01); *H04N 21/262* (2013.01); *H04N 21/47202* (2013.01); *H04N 21/6125* (2013.01); *H04N 21/6405* (2013.01); *H04N 21/6408* (2013.01)

(58) Field of Classification Search
CPC .................... H04N 21/266; H04N 7/17336
See application file for complete search history.

(56) References Cited

U.S. PATENT DOCUMENTS 7,020,710 B2   3/2006   Weber et al.
7,150,031 B1 *  12/2006  Rodriguez ............ G06F 3/0482
                                                        348/E5.002

(Continued)

FOREIGN PATENT DOCUMENTS

CA        2325647 A1    5/2001
WO      03044667 A1    5/2003

OTHER PUBLICATIONS

Touch, Joe, et al., "Proactive Unicast and Multicast Web Cache Management", National Laboratory for Applied Network Research in Proceedings of the NLANR Web Cache Workshop, Boulder, Colorado, USA , Jun. 1997.

(Continued)

*Primary Examiner* — Jason K Lin
(74) *Attorney, Agent, or Firm* — Stewart M. Wiener

(57) ABSTRACT

Methods of delivering IP video content to CPE devices over a network are provided. Customer content-of-interest information is collected from the CPE devices. When a request for an item of content from a requesting one of the CPE devices is received, a determination is made as to whether the requested item of content is of interest to at least a pre-determined minimum number of other CPE devices on the network via analysis of the collected content-of-interest information. The item of content may be multicast over the network if the item of content is of interest to at least the pre-determined minimum number of CPE devices. Alternatively, content indicated as being of interest by at least the pre-determined number of CPE devices may be scheduled for multicast at a low utilization time of the network or at a low priority level. A system for preforming the above methods is disclosed.

12 Claims, 3 Drawing Sheets

(51) Int. Cl.
  *H04N 21/472* (2011.01)
  *H04N 21/6408* (2011.01)

(56) References Cited

U.S. PATENT DOCUMENTS

| | | | |
|---|---|---|---|
| 2003/0066093 A1* | 4/2003 | Cruz-Rivera | H04N 7/17318 |
| | | | 725/146 |
| 2004/0042479 A1* | 3/2004 | Epstein | H04L 12/1845 |
| | | | 370/432 |
| 2004/0107443 A1 | 6/2004 | Clancy | |
| 2007/0174471 A1* | 7/2007 | Van Rossum | H04L 29/06 |
| | | | 709/229 |
| 2009/0093544 A1 | 4/2009 | Fischer et al. | |
| 2009/0293095 A1* | 11/2009 | Karaoguz | H04N 7/17336 |
| | | | 725/119 |
| 2011/0154382 A1* | 6/2011 | Chow | H04N 21/25841 |
| | | | 725/5 |
| 2011/0179453 A1* | 7/2011 | Poniatowski | G06F 3/0482 |
| | | | 725/58 |
| 2014/0282777 A1* | 9/2014 | Gonder | H04L 65/605 |
| | | | 725/109 |

OTHER PUBLICATIONS

"The LSAM Proxy Multicast Channel Architecture" by USC/ISI, http://www.isi.edu/lsam/channels/about-channels.html, Feb. 1999.

* cited by examiner

SYSTEM AND METHODS FOR MULTICAST DELIVERY OF INTERNET PROTOCOL VIDEO CONTENT

BACKGROUND

Multiple System Operators (MSOs) and other service providers operate or provide networks over which content, such as video or multimedia content, may be delivered to subscribers. Various techniques may be used to deliver content, for instance, Video-on-Demand (VOD) services, Over-the-Top (OTT) services, and the like. VOD, for instance, is interactive technology that permits subscribers to purchase, download, and view pre-recorded multimedia programming, such as movies and the like, upon request at any time.

A problem with the delivery of such content over a network is that the network may not have sufficient available network bandwidth at times, particularly during peak viewing hours, resulting in bottlenecks and prolonged download times or unsuccessful or incomplete downloading. Typically, such content is provided via unicast, which is a communication between a single sender and a single receiver over a network. When large numbers of consumers or subscribers demand a variety of programs during a given period of time, the total amount of data delivery involved may overwhelm available network resources.

Internet Protocol (IP) video content, in particular, has become a significant and primary consumer of Internet bandwidth. As stated above, network congestion can be experienced at peak viewing hours. Such congestion may force network operators to incur expenses in upgrading their network capacities to keep pace with the increasing demand for bandwidth during peak network utilization periods.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
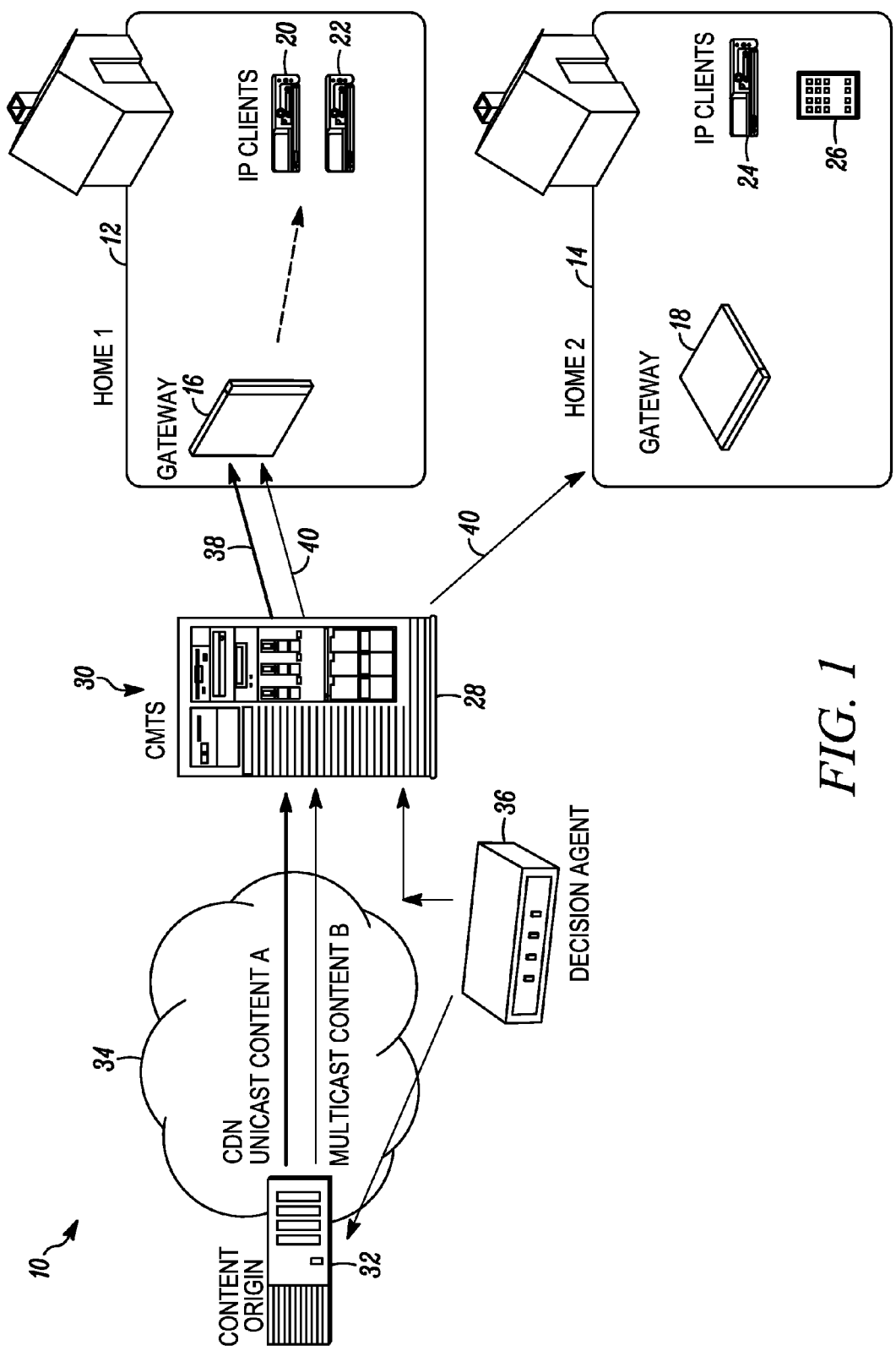
FIG. 1 depicts components of system architecture in accordance with an illustrative example of an embodiment.
Figure 2:
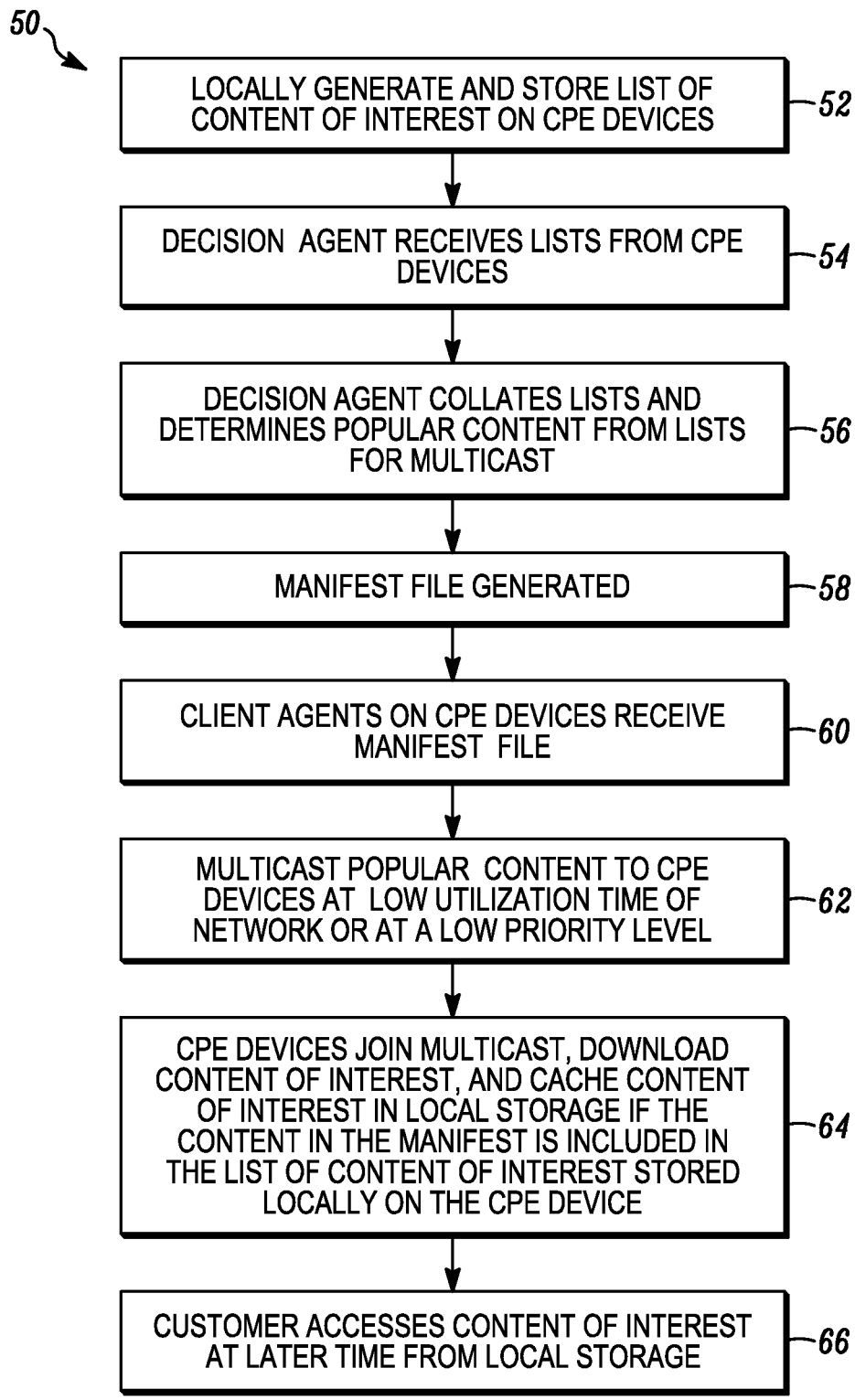
FIG. 2 is a flowchart of a content delivery method in accordance to an embodiment.
Figure 3:
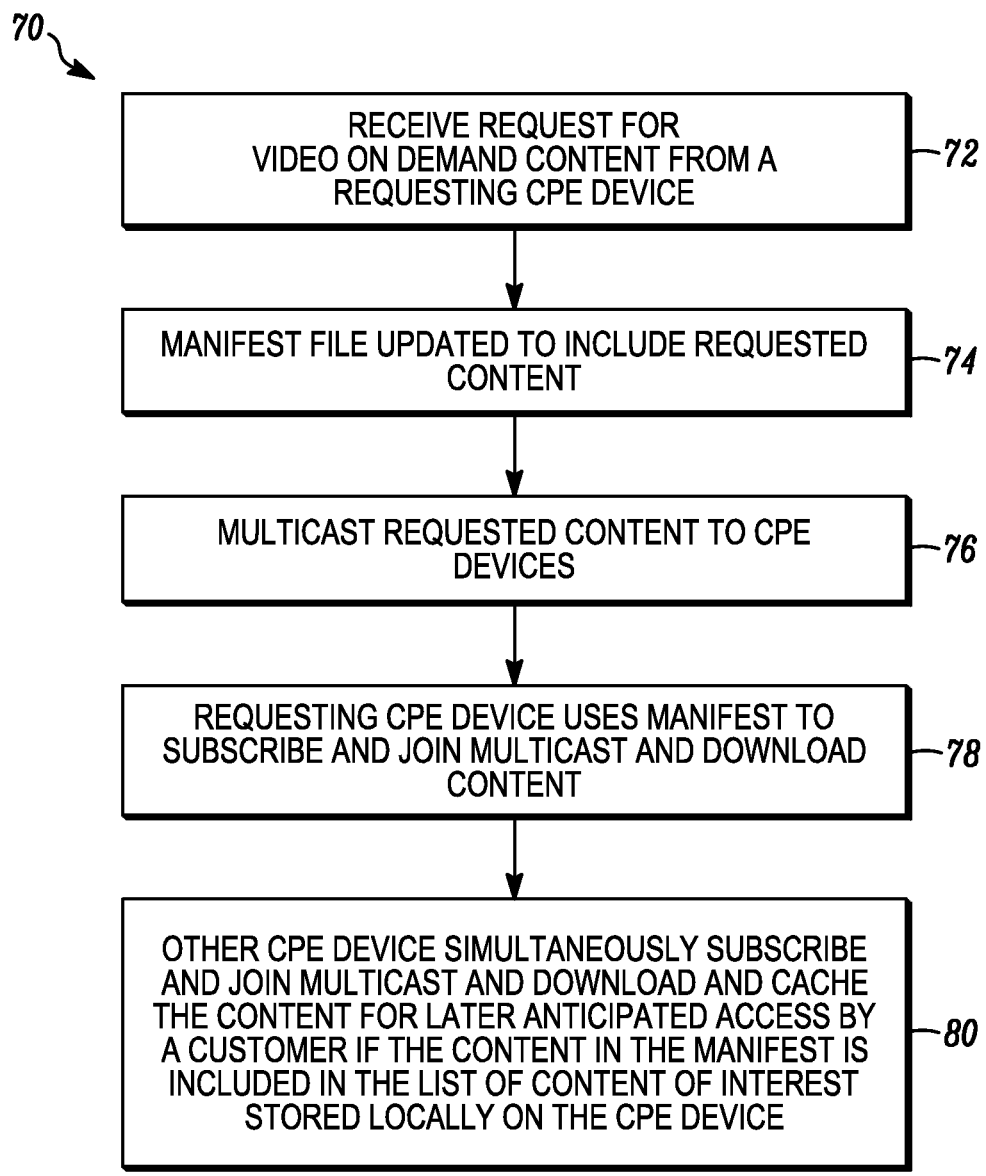
FIG. 3 is a flowchart of an alternate content delivery method in accordance to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

There are various forms of networks over which IP video content may be delivered. However, for purposes of example, a network may extend from a headend in a tree and branch structure to numerous subscribers having Customer Premises Equipment (CPE). For instance, such a network may be a cable network.

Examples of CPE devices may include IP enabled media gateways and set-top boxes. These devices may communicate directly or indirectly with other so-called IP client devices at the customer site as well as a Cable Modem Termination System (CMTS) located at the headend of the network. By way of example, a gateway may communicate with several set top boxes, a computer, a tablet device, a gaming module, a smart phone, or the like at the customer site. The IP client devices may enable the viewing of IP video content on an associated display and may enable the user to interact with a service provider or the like via communications with the CMTS, such as required for submitting a request for IP video content on demand.

According to an embodiment, a system for delivering IP video over a network includes the use of a predictor of content of interest. The content of interest may be movies, shows, or any pre-recorded content including IP video. The content of interest is not content currently being demanded or requested for purchase or viewing by a CPE device; rather, it is content that is merely indicated by a customer or customers as being likely to be requested and viewed at a future unspecified time without incurring any commitment at the present time.

The predictor may be used to cause a pre-determined item or items of content to be made available to CPE devices at customer sites simultaneously via IP multicast instead of later being transmitted to each individual CPE device upon separate requests via a series of separate unicasts. A multicast communication differs from unicast in that it is a communication of data across the network from one to many, thereby enabling efficient use of available network bandwidth Thus, the embodiment enables relatively popular IP video content capable of being delivered via video on demand, over the top, or like services to be tagged for multicast delivery and enables a client agent at the customer site to cache multicast content indicated as being of interest to a particular customer at the same time the content is being delivered to another customer. One or more CPE devices on the network may subscribe and join the multicast of the content of interest and cache the IP content in local storage. The local storage may be storage physically within the CPE device or external to the CPE device, but within a customer's own network, for instance, customer network attached storage (NAS) readily available to the CPE device. Thereafter, at a later time, should the customer decide to formally request the content for viewing, the content already exists in local storage for immediate purchase and/or consumption.

The delivery system according to the embodiment is expected to yield savings in bandwidth of network resources. For example, according to one embodiment, the IP multicast can be made available, subscribed to, downloaded, and cached at low utilization times of network resources. A low utilization time may be at 3 AM or other time not during peak utilization time of the network thereby enabling use of otherwise excess available bandwidth.

As an alternative according to another embodiment, the IP multicast may be made available at a point in time when a video on demand request is received for a pre-determined item of content such that the content is downloaded and cached not only by the particular requesting CPE device, but also by other CPE devices on the network indicated as having an interest in the content as discussed above.

With respect to providing the predictor of content of interest, a user interface may be made available to each subscriber on the network for entry of content that a particular consumer is likely to desire to view in the future.

Thus, the user interface may allow a user to view and search titles or the like of various available items of content in various formats and indicate interest in selected content. Preferably, the user interface is of a form that makes it easy for a customer to select videos, for instance, on their IP client devices such as tablets, smart phones, or the like. Thus, each subscriber may select videos of interest and store a list of such items of video content locally with a client agent on a CPE device, such as a gateway device or the like, at the customer site and such information may be periodically transmitted upstream over the network to the headend of the network to a so-called Decision Agent (DA). The client agent may also provide the function of listening for information concerning an appropriate multicast to decide whether the CPE device should cache specific multicast streams in local storage.

The decision agent at the headend of the network or in communication with the headend of the network may receive, collect, and accumulate the lists of contents of interest forwarded from CPE devices. With information concerning the specific CPE devices and their related items of contents of interest, the decision agent can make predictions as to which items of content are likely to be requested for download in the future by various ones of the CPE devices. For example, if a particular item of content is determined to be of interest by at least a pre-determined minimum number of customers (such as two or more), the item of content may be selected for IP multicast during a low utilization time of the network (or at a low priority level) so that it may be subscribed to by the CPE devices which identify the item of content as being of interest. Thus, for instance, if more than one customer is interested in the content, a decision may be made to multicast the content, such that multiple CPE devices of separate interested customers will subscribe and cache the content automatically.

Additionally, whenever a particular customer or CPE device issues a request or demand for an item of content, if the decision agent determines that other CPE devices on the network include the item of content as being of interest, the item of content may be multicast so that the requesting CPE device as well as other CPE devices on the network indicating interest in the content may join the multicast and download and cache the video. Thus, the decision agent utilizes information contained in the lists to make content available to many interested customers simultaneously, such as when consumed by an individual customer via a video on demand request.

FIG. 1 shows a part of a network 10 to which customer sites 12 and 14 (i.e., Home 1 and Home 2, respectively) are connected. A gateway CPE device, 16 and 18, respectively, is located at each customer site. The gateway 16 communicates with a pair of IP client devices, in this case set top boxes 20 and 22, at customer site 12, and the gateway 18 communicates with a pair of IP client devices, in this case set top box 24 and tablet device 26, at customer site 14. Both gateways 16 and 18 may include a client agent and receive and transmit signals to a Cable Modem Termination System (CMTS) 28 or like network bi-directional communication device at the headend 30 of the network 10.

The CMTS 28 is connected to a content origin server 32 or the like via a content distribution network 34 or the like from which the CMTS 28 may receive content requested or of interest to the customer sites, 12 and 14. In addition, CMTS 28 is also in communication with a decision agent 36 that may be located at the headend 30 or is in communication with the headend.

As discussed above, the customers utilize a user interface, for instance provided by IP client devices, 20, 22, 24 and 26, for purposes of generating a list of content of interest that is stored in gateways 16 and 18 via a client agent. Periodically, information with respect to the lists of content of interest is transmitted to the decision agent 36. As examples, the information could be delivered directly to the decision agent 36 via communication over the network 10, over an entirely different network, or from a server hosting the CPE user interface in the cloud. The decision agent 36 collects the lists and determines therefrom whether or not a particular item of content should be tagged for being transmitted via multicast or unicast and when such transmission should be provided, for instance, immediately or during the next low utilization time period of the network. The decision agent 36 may also determine the priority level of the transmission (i.e., quality of service level).

For example, IP client 20 or 22 at customer site 12 may issue a request via a video on demand or like service for IP video content "A". At the time of the request, if the decision agent 36 determines that content "A" is not included in any of the collected lists of content of interest and therefore is not considered of likely interest to any other customer, the decision agent 36 may instruct the content origin server 32 or the like to transmit content "A" in the form of a unicast 38. Thus, the gateway 16 and/or associated client devices may receive the content which is then available for viewing by the customer at customer site 12.

With respect to content "B", IP client device 20 or 22 at customer site 12 may issue a request via a video on demand or like service for IP video content "B". At the time of the request, if the decision agent 36 determines that content "B" is included in the list of contents of interest collected from customer site 14, and therefore is considered of interest to multiple customers on the network, the decision agent 36 may tag content "B" for multicast. Thus, the decision agent 36 may instruct the content origin server 32 or the like to use multicast 40. All relevant CPE devices (requesting device and devices identifying the content as being "of interest") are informed of the multicast address on which the content will be sent so that they may subscribe to the multicast. For example, the content multicast address information may be sent via a different predetermined multicast address to which the CPE devices are already subscribed. Accordingly, the gateways and/or client devices may join the multicast and download and cache IP video content "B" locally at customer sites 12 and 14. Thus, if a customer at customer site 14 decides to formally request or purchase and view content "B" at a future time, the IP video stream of content "B" will already be stored locally for immediate release and consumption by the customer. Additional delivery over the network is avoided thereby saving bandwidth.

As an alternative, if gateway devices 16 and 18 at customer sites 12 and 14 both include content "B" as being content of interest, the decision agent 36 may tag content "B" for IP multicast delivery during a low utilization time of the network and/or may instruct the content origin server 32 to provide the content as a multicast 40 so that both gateways 16 and 18 may join the multicast and download and cache content "B" at customer sites 12 and 14. In this case, the decision agent 36 may instruct the content origin server 32 to delay transmission of the multicast 40 until the next expected low utilization period of the network or may instruct the CMTS to transmit the multicast at a low priority level of quality of service since content "B" is not needed for immediate viewing.

According to an embodiment, a method 50 for content delivery includes a step 52 of generating a list of items of video content of interest by some or all customers on a network. The list may be created with a user interface permitting customers to select content of interest via their CPE device and/or IP client device. After such a list is generated and stored locally on a CPE device, such as a gateway device, the CPE device may periodically transmit the list to a network server, such as the decision agent discussed above. See step 54.

In step 56, the network server collates the various lists and determines popular content that will benefit from being multicast. Thereafter, the network server may generate a manifest file in step 58, indicating relatively popular content that will be sent via multicast from the headend over the network. Client agents on CPE devices on the network may listen for and subscribe to the manifest file in step 60, and each CPE device may individually determine whether any of the items of content in the multicast should be joined and downloaded based on the locally stored list of items of interest. Thereafter, the network server multicasts the popular content in step 62, preferably at times of low network utilization (or at a low priority), enabling appropriate ones of the CPE devices to subscribe to and join the multicast, download the content or contents of interest, and cache the content or contents of interest in local storage. See step 64 Accordingly, at a later time in step 66, a customer may purchase and/or view the content of interest, which is already stored in local storage and does not need to be provided to the CPE device via a separate unicast.

According to a further aspect of a method 70, when a particular item of video on demand content is requested by a requesting CPE device for immediate download and viewing in step 72, the network server updates the manifest file in step 74 and transmits the request content as a multicast 76. The requesting CPE device uses information in the manifest to subscribe to and join the multicast of the demanded content in step 78. In addition, other CPE devices on the network may simultaneously subscribe to and join the multicast of the video on demand content if the item of content in the manifest is also included in the list of content of interest stored locally on the CPE device. See step 80. In this case, the CPE device joins the multicast and downloads and caches the content in local storage for later anticipated access by a customer.

Accordingly, the embodiments discussed above enable popular content that is being viewed by a single customer to be downloaded simultaneously and recorded by other customers who have indicated possible interest in the content. Thus, since network operators, such as cable operators, are under constant pressure to provide additional bandwidth, the embodiments function to reduce bandwidth requirements. In addition, the embodiments may also alleviate server loads of Over The Top (OTT) video providers and cable operators. The end user may also benefit by avoiding slow downloads and congestion and by being able to quickly access content even during high congestion times since the content is cached in local storage.

While the principles of the invention have been described above in connection with specific devices, apparatus, systems, and/or methods, it is to be clearly understood that this description is made only by way of example and not as limitation. One of ordinary skill in the art will appreciate that various modifications and changes can be made without departing from the scope of the claims below. Accordingly, the specification and figures are to be regarded in an illustrative rather than a restrictive sense, and all such modifications are intended to be included within the scope of the present invention.

The above referenced devices for carrying out the above methods can physically be provided on a circuit board or within another electronic device and can include various processors, microprocessors, controllers, chips, disk drives, and the like. It will be apparent to one of ordinary skill in the art that the modules, processors, controllers, units, servers, agents, and the like may be implemented as electronic components, software, hardware or a combination of hardware and software. While some devices and processors may be described or depicted herein as separate entities, the functions may be combined into fewer or greater number of physical entities. Also, the term set top box is not intended to be limited to the structure of a box or be located on top of another device, such as a television set. The set top box may take any form and be placed at any location within the customer site.

The word "comprise" or a derivative thereof, when used in a claim, is used in a nonexclusive sense that is not intended to exclude the presence of other elements or steps in a claimed structure or method. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method of delivering video content to a Customer Premises Equipment (CPE) device over a network, comprising the steps of:

in a decision agent device comprising a specialized computing device, the specialized computing device comprising one or more processors in a server communicatively coupled to the network, collecting customer content-of-interest indicator information from a respective plurality of CPE devices on the network, wherein the content-of-interest indicator information indicates that an associated content-of interest has been indicated by a user of the respective CPE device as being likely to be requested and viewed at a future unspecified time without incurring any commitment by the user at the time of giving the indication, and wherein the content-of-interest is not content being demanded or requested for purchase or viewing by the respective CPE device;

after said collecting step, receiving a request in a Cable Modem Termination System (CMTS) communicatively coupled via the network to the decision agent device and to the plurality of CPE devices, the request being for a pre-determined item of content from a requesting one of the plurality of CPE devices on the network, the pre-determined item of content including Internet Protocol (IP) video content;

in the decision agent device, determining from the customer content-of-interest indicator information collected during said collecting step if the predetermined item of content requested by said requesting one of the plurality of CPE devices is also of interest to at least a pre-determined minimum number of other of the plurality of CPE devices; and in the CMTS, causing the pre-determined item of content to be multicast over the network to the at least a pre-determined minimum number of other of the plurality of CPE devices, if the pre-determined item of content is content-of interest to the at least the predetermined minimum number of other of the plurality of CPE devices.

2. The method according to claim 1, wherein, if the pre-determined item of content is content-of-interest to less than the pre-determined minimum number of other of the plurality of CPE devices when the request is received, the pre-determined item of content is caused to be unicast over the network to the requesting one of the plurality of CPE devices.

3. The method according to claim 1, further comprising the step of generating signaling indicating availability of the pre-determined item of content as a multicast to the CPE devices and transmitting the signaling to the CPE devices over the network so that the requesting one and the at least pre-determined minimum number of other of the plurality of CPE devices may automatically subscribe to the multicast and cache the pre-determined item of content in local storage.

4. The method according to claim 3, wherein the signaling is a manifest file.

5. The method according to claim 3, wherein the local storage is storage within a subscribing CPE device.

6. The method according to claim 1, further comprising the step of presenting a user interface to a customer via a CPE device for entry of content-of-interest indicator information for being collected during said collecting step.

7. The method according to claim 1, wherein the pre-determined item of content is recorded or non-live IP video content, wherein the CPE devices include at least one of a customer gateway device, an IP enabled set top box, and an IP client device, and wherein the network is communicatively coupled to a plurality of devices at a headend, the plurality of devices comprising the CMTS and the decision agent device.

8. A content delivery system, comprising:
a decision agent device comprising a specialized computing device, the specialized computing device comprising one or more processors in a server communicatively coupled to a network, the one or more processors configured to electronically collect customer content-of-interest indicator information from a plurality of Customer Premises Equipment (CPE) devices connected to the network, wherein the content-of-interest indicator information indicates that an associated content-of-interest has been indicated by a user of the respective CPE device as being likely to be requested and viewed at a future unspecified time without incurring any commitment by the user at the time of giving the indication, and wherein the content-of-interest is not content being demanded or requested for purchase or viewing by the respective CPE device; and
a transmitter communicatively coupled via the network to the decision agent device and to the plurality of CPE devices, the transmitter configured to transmit content-of-interest as an IP multicast including Internet Protocol (IP) video content to the CPE devices over the network;
wherein the one or more processors of the decision agent device are further configured to:
determine, from the customer content-of-interest indicator information electronically collected, and based upon at least a request in a Cable Modem Termination System (CMTS) communicatively coupled via the network to the decision agent device and to the plurality of CPE devices, the request being for a predetermined item of content from a requesting one of the plurality of CPE devices on the network, whether the predetermined item of content requested by said requesting one of the plurality of CPE devices is also of interest to at least a pre-determined minimum number of other of the plurality of CPE devices; and
cause the transmitter to transmit the predetermined item of content requested, as a multicast over the network to the CPE devices, if the predetermined item of content is of interest to at least the pre-determined minimum number of the plurality of CPE devices.

9. The content delivery system according to claim 8, further comprising a user interface unit within each of said CPE devices configured to receive user input with respect to content-of-interest.

10. The content delivery system according to claim 8, wherein the transmitter is configured to generate signaling indicating availability of the pre-determined item of content as a multicast to the CPE devices and to transmit the signaling to the CPE devices over the network so that interested ones of the plurality of CPE devices may automatically subscribe to the multicast and cache the pre-determined item of content in local storage.

11. The content delivery system according to claim 8, wherein the local storage is storage within a subscribing CPE device.

12. The content delivery system according to claim 8, wherein the content-of-interest is recorded or non-live IP video content, wherein the CPE devices include at least one of a customer gateway device, an IP enabled set top box, and an IP client device, wherein the decision agent device and the transmitter are located at a headend of the network, and wherein a Cable Modem Termination System (CMTS) at the headend comprises the transmitter.

\* \* \* \* \*